United States Patent
Ganor

(10) Patent No.: US 7,826,828 B2
(45) Date of Patent: Nov. 2, 2010

(54) METHOD AND SYSTEM FOR DETECTING AVAILABILITY OF A WIRELESS DEVICE

(75) Inventor: Tamir Ganor, Kfar saba (IL)

(73) Assignee: Comverse, Ltd., Tel Aviv (IL)

( * ) Notice: Subject to any disclaimer, the term of this patent is extended or adjusted under 35 U.S.C. 154(b) by 2163 days.

(21) Appl. No.: 10/424,922

(22) Filed: Apr. 29, 2003

(65) Prior Publication Data

US 2004/0219908 A1    Nov. 4, 2004

(51) Int. Cl.
*H04M 3/42* (2006.01)
*H04W 4/00* (2009.01)
*H04W 4/12* (2009.01)
*H04W 24/00* (2009.01)

(52) U.S. Cl. .............. 455/414.1; 455/435.1; 455/456.1; 455/456.2; 455/461; 455/466

(58) Field of Classification Search .............. 455/414.1, 455/414.2, 422.1, 432.3, 456.1–456.3, 457
See application file for complete search history.

(56) References Cited

U.S. PATENT DOCUMENTS

| | | | |
|---|---|---|---|
| 5,903,726 A * | 5/1999 | Donovan et al. ............ 709/206 |
| 6,134,314 A * | 10/2000 | Dougherty et al. ..... 379/201.01 |
| 6,351,648 B1 * | 2/2002 | Karapetkov et al. ......... 455/466 |
| 6,587,691 B1 * | 7/2003 | Granstam et al. ............ 455/457 |
| 6,714,793 B1 * | 3/2004 | Carey et al. .................. 455/466 |
| 6,718,178 B1 * | 4/2004 | Sladek et al. ............... 455/466 |
| 6,990,353 B2 * | 1/2006 | Florkey et al. .............. 455/519 |
| 7,171,222 B2 * | 1/2007 | Fostick ....................... 455/466 |
| 7,224,978 B2 * | 5/2007 | Zellner et al. ............ 455/456.1 |
| 2001/0031641 A1 * | 10/2001 | Ung et al. .................... 455/456 |
| 2002/0173308 A1 * | 11/2002 | Dorenbosch et al. ........ 455/435 |
| 2003/0036392 A1 * | 2/2003 | Yukie ........................ 455/461 |

* cited by examiner

*Primary Examiner*—Harry S Hong
(74) *Attorney, Agent, or Firm*—Ohlandt, Greeley, Ruggiero & Perle, L.L.P.

(57) ABSTRACT

A method and system for determining availability of a target device in a CDMA environment includes sending a message from a source device for determining the availability of a target device, wherein an intermediary device generates an interrogation command upon receipt of the message. The intermediary device uses the interrogation command to interrogate an HLR in the CDMA environment in order to determine the availability of the target device, such that the intermediary device alerts the source device when the target device becomes available.

11 Claims, 9 Drawing Sheets

Phone Not Available (GSM Scenario)

Phone Becomes Available (GSM Scenario)

Phone Not Available (CDMA Scenario)

Phone Becomes Available (CDMA Scenario)

METHOD AND SYSTEM FOR DETECTING AVAILABILITY OF A WIRELESS DEVICE

BACKGROUND OF THE INVENTION

1. Field of the Invention

This invention relates to mobile communications and, more specifically, to a method of determining the availability of a wireless device in a CDMA network.

2. Background and Related Art

Global System for Mobile Communication (GSM) is one standard for wireless mobile communications. Code Division Multiple Access (CDMA) represents another wireless mobile communications technology. Short Message Service (SMS) is a mobile data service supported by both GSM and CDMA communications networks. SMS allows text messaging to and from devices, including wireless devices. These messages are limited in size and can be received simultaneously during a voice or data call because SMS uses a signaling path that is separate from a voice path.

SMS is a store-and-forward service that guarantees delivery of a message by the network and provides delivery confirmation. Messages are sent to a Short Message Service Center (SMSC) by a device, and the SMSC interacts with the communications network to deliver the message to the intended recipient. The message from the sending device is stored in the SMSC, which then forwards it to the destination device. If delivery of the message fails, delivery of the stored message can be retried later. SMS provides delivery confirmation by way of return receipts. Thus, if desired, the sender can receive a message confirming that the sent message was delivered to the intended recipient.

Once a message is received by the SMSC, the SMSC must deliver it to the intended recipient. In order to deliver the message to the appropriate recipient, the SMSC interrogates a Home Location Register (HLR) (and possibly a Visitor Location Register (VLR), if the device is roaming) of the destination device. In response to this Home Location Register Interrogation (HLRI), the destination device's HLR provides the necessary routing information to get the message to the intended recipient. The HLR is a main database of the communications network. The HLR is used for the permanent storage and management of subscriptions and service profiles.

The determination of when a wireless device in the communications network becomes available, i.e., for receiving calls and short messages, is useful information. Availability of the wireless device can basically be viewed as synonymous with the device being turned on and in coverage. Thus, device availability includes, for example, activation of the device in the communications network, the device becoming reachable after visiting an area not covered by the communications network, selection of a new communications network to provide service upon visiting a new area, etc.

Activation of a device entails that when the device first comes into radio communication with a mobile communications network, for example when the device is powered on in the network or moves into a cell of the network from another cell, the device engages in registration negotiation with the mobile communications network. If negotiation registration is successful, an HLR associated with the device is updated to reflect the availability of the device.

For example, information on the availability of a device is useful to an application that has to send updated SMS information to an end user of the device, as well as for the optimization of network resources. One way that availability information can be used to optimize network resources is it allows placement of a call or delivery of a message to be predicated on the availability of the intended recipient of the call or message, as opposed to simply trying over and over again to place a call or send a message until you eventually succeed in completing the call or having the message delivered.

The GSM standard provides a mechanism for being alerted when a wireless device in the communications network becomes available. In the GSM environment, an SMS Class 0 short message (SMS0) can be used to obtain an alert when a user's device becomes available. An SMS0 is often referred to as a "flash" short message, a "blinking" short message, or an "alert" short message. An SMS0 is generally not stored in the memory of the user's device.

For example, as shown in FIG. 1 for a GSM environment, an application 110 sends an SMS0 to the SMSC 120, as shown by flow 140, in order to get an alert when the handset 130 becomes available. Since the handset 130 is currently unavailable, the SMSC 120 fails to deliver the SMS0, as shown by dashed flow 150, and waits for the handset 130 to become available so that delivery of the SMS0 can be completed.

As further shown in FIG. 2 for the GSM environment of FIG. 1 (wherein similar elements retain the same reference numbers), when the handset 130 finally becomes available, the SMS0 is successfully delivered by the SMSC 120 to the handset 130, as shown by flow 250. The SMS0 represents an empty message, the receipt of which does not interfere with a user of the handset 130. For example, although receipt of an SMS0 is acknowledged, it does not require any user interaction to retrieve the message. Furthermore, the SMS0 may be automatically discarded upon receipt.

An acknowledgement is returned to the SMSC 120, as shown by flow 260, indicating that the SMS0 was successfully delivered, and thus the handset 130 is available. An alert is subsequently sent from the SMSC 120 to the application 110, as shown by flow 270. Upon receipt of this alert, the application 110 can send a real (i.e., non-empty) message with updated/current content to the handset 130 via the SMSC 120, as shown by flows 280 and 290.

Other components of the communications network, for example a Mobile Switching Center (MSC), have been omitted in order to simplify the above discussion.

Thus, the GSM standard provides a mechanism wherein an application can be alerted when a wireless device in the communications network becomes available. However, there is no equivalent functionality for SMS0 available in a CDMA environment.

One approach to providing an alert when a user becomes available in a CDMA environment involves sending an empty SMS message to the user's handset. However, this approach causes the user to receive an SMS message with no data in it, and thus requires interfering with the user.

Another approach involves simply sending the data in an SMS message to the handset without first confirming that the user is available. However, this approach can result in the user receiving a message with data that is not updated. Thus, if the user's device is not available when the SMS message is sent, by the time the user's device becomes available and the stored SMS message is forwarded to the user's device, the data in the SMS message might be obsolete or incorrect.

SUMMARY OF THE INVENTION

To overcome the problems and limitations of the aforementioned approaches, it is an object of the invention to provide a method and system for detecting the availability of a device in a CDMA environment without interfering with a user of the device.

Furthermore, the method and system ensures that information is sent to a user only when the user is available. Thus, the problem of obsolete or incorrect information in an SMS message is avoided because long storage times are not used.

Further still, as described above, the method and system can be used for optimizing network resources based, for example, on the availability of users.

Thus, a method and system for providing SMS0-type functionality in a CDMA environment is disclosed.

An exemplary method for detecting the availability of a device in a communications network, includes:
  sending a first message from a source to the device;
  generating a command in response to the first message, said command being for interrogating a database;
  interrogating the database responsive to the command to determine whether the device is available, said database including data that represents the availability of the device;
  if the device is available, alerting the source that the device is available; and
  if the device is not available, requesting that an alert be sent to the source when the device becomes available.

Furthermore, an exemplary system for detecting the availability of a device in a communications network, may include:
  an intermediary device for relaying data from a source device to the target device; and
  a database for storing data describing availability of the target device,
  wherein the intermediary device generates a command for interrogating the database upon receipt of the first message;
  wherein if the target device is determined to be available, the intermediary device informs the source device that the target device is available; and
  wherein if the target device is determined to not be available, the intermediary device requests that the source device be alerted when the target device becomes available.

Further aspects, features and advantages of the invention will become apparent from the consideration of the following description and the appended claims when considered in connection with the accompanying drawings.

BRIEF DESCRIPTION OF THE FIGURES

With specific reference now to the drawings in detail, it is stressed that the particulars shown are by way of example and for purposes of illustrative discussion of exemplary embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in this field how the invention may be embodied in practice. In the accompanying drawings.

DETAILED DESCRIPTION OF THE PREFERRED EMBODIMENTS

The following is a detailed description of an illustrative, non-limiting embodiment of the present invention.

Figure 1:
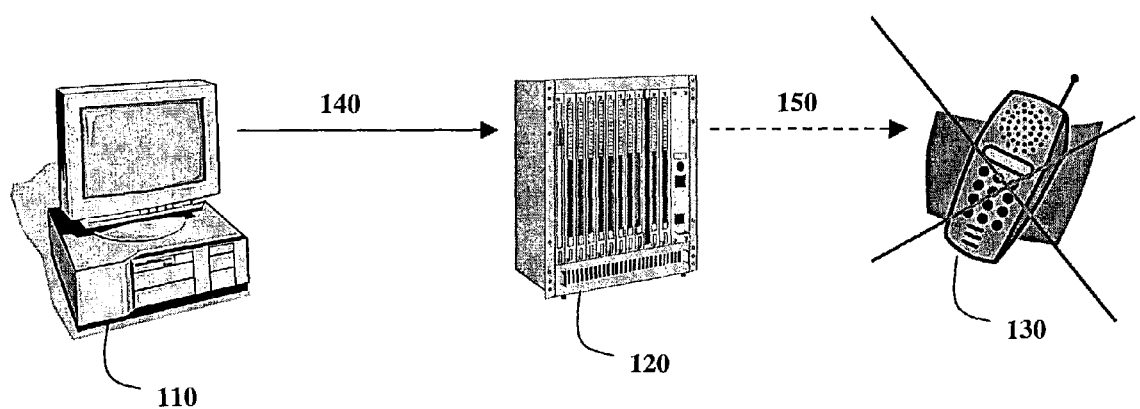
FIG. 1 illustrates a system for determining the availability of a device in a GSM network using an SMS Class 0 message, wherein the device is currently unavailable.
Figure 2:
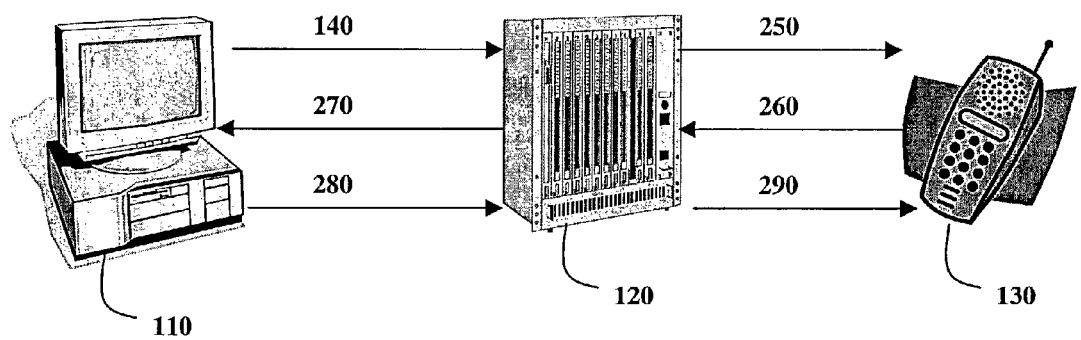
FIG. 2 illustrates the system for determining the availability of a device in the GSM network of FIG. 1, after the device has become available.
Figure 3:
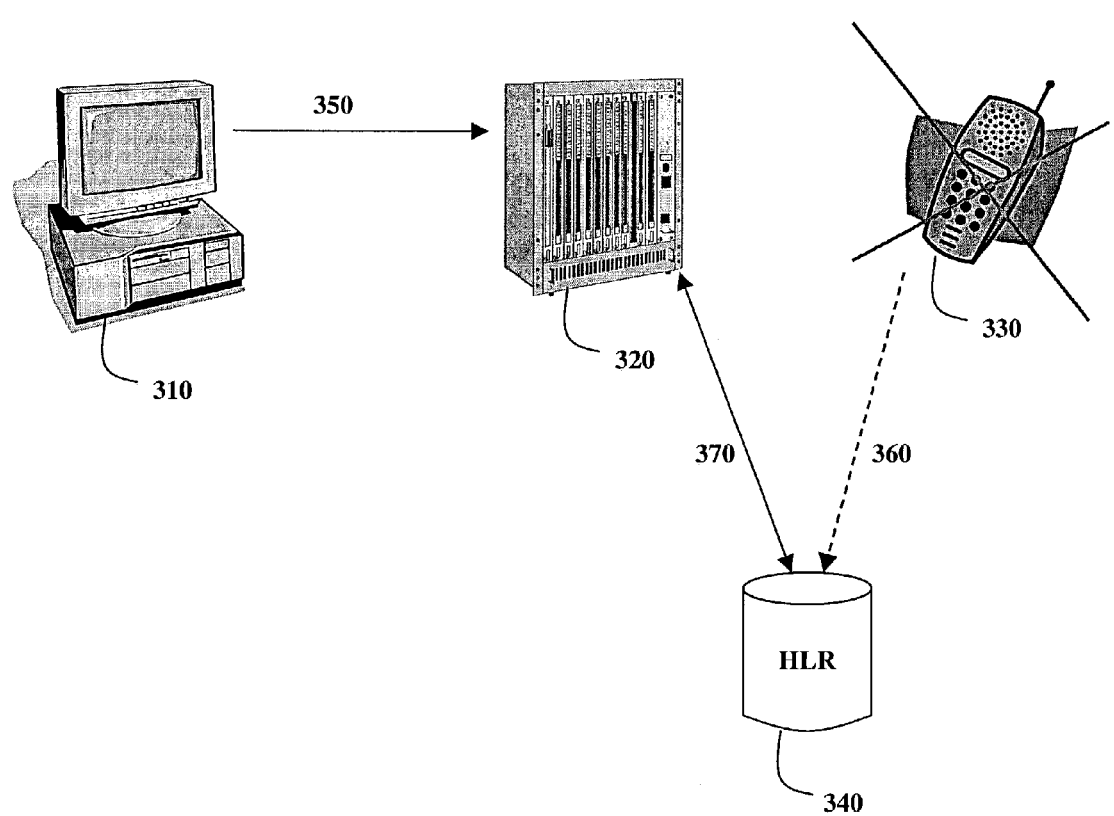
FIG. 3 illustrates a system for determining the availability of a device in a CDMA network, wherein the device is currently unavailable.

FIG. 3 illustrates an application 310 that wants to determine whether a handset 330 operating in a CDMA communications network is available. The application 310 sends a message, as shown by flow 350, to the SMSC 320 in order to determine the availability of the handset 330. For example, the application 310 sends an SMS0 to the SMSC 320.

Upon receipt of the message requesting the availability of the handset 330, the SMSC 320 converts the SMS0, which is not supported in the CDMA network, to a command for interrogating an HLR 340. The SMSC 320 sends the command, as shown by flow 370, to the HLR 340 to determine whether the handset 330 is active within the CDMA network. Because the handset 330 is not currently active in the CDMA network, the HLR 340 has not received an activation message, as shown by dashed flow 360, from the handset 330.

Consequently, the SMSC 320 determines that the handset 330 is currently not available. The SMSC 320 then sends a command, as again shown by flow 370, to the HLR 340 instructing the HLR 340 to alert the SMSC 320 when the HLR 340 receives an activation message from the handset 330. Alternatively, the SMSC 320 can be configured to periodically check the HLR 340 in order to determine whether the HLR 340 has received an activation message from the handset 330.

Figure 4:
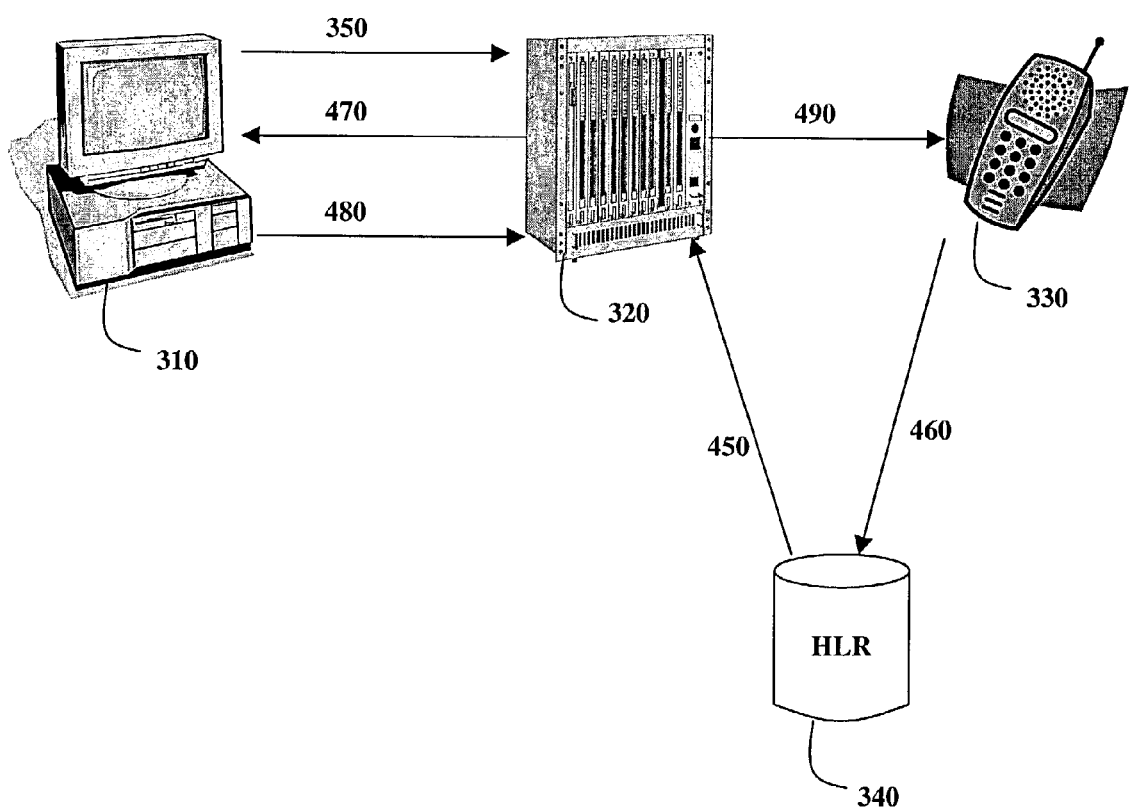
FIG. 4 illustrates the system for determining the availability of a device in the CDMA network of FIG. 3, after the device has become available.

As shown in FIG. 4, the handset 330 engages in registration negotiation with the mobile communications network, such that data in the HLR 340 is updated to reflect the availability of the device, as shown by flow 460. This registration negotiation occurs upon activation of the handset 330, for example when the handset comes into radio communication with a cell (e.g., the handset 330 is powered on in the cell or moves into the cell from a different cell).

In response to receiving a registration message from the handset 330, the HLR 340 notifies the SMSC 320, as shown by flow 450, that the handset 330 is now available.

Upon being notified that the handset 330 is available, the SMSC 320 alerts the application 310, as shown by flow 470, that the handset 330 is available. The application 310 then proceeds to send data/content to the handset 330 via the SMSC 320, as shown by flows 480 and 490.

Figure 5:
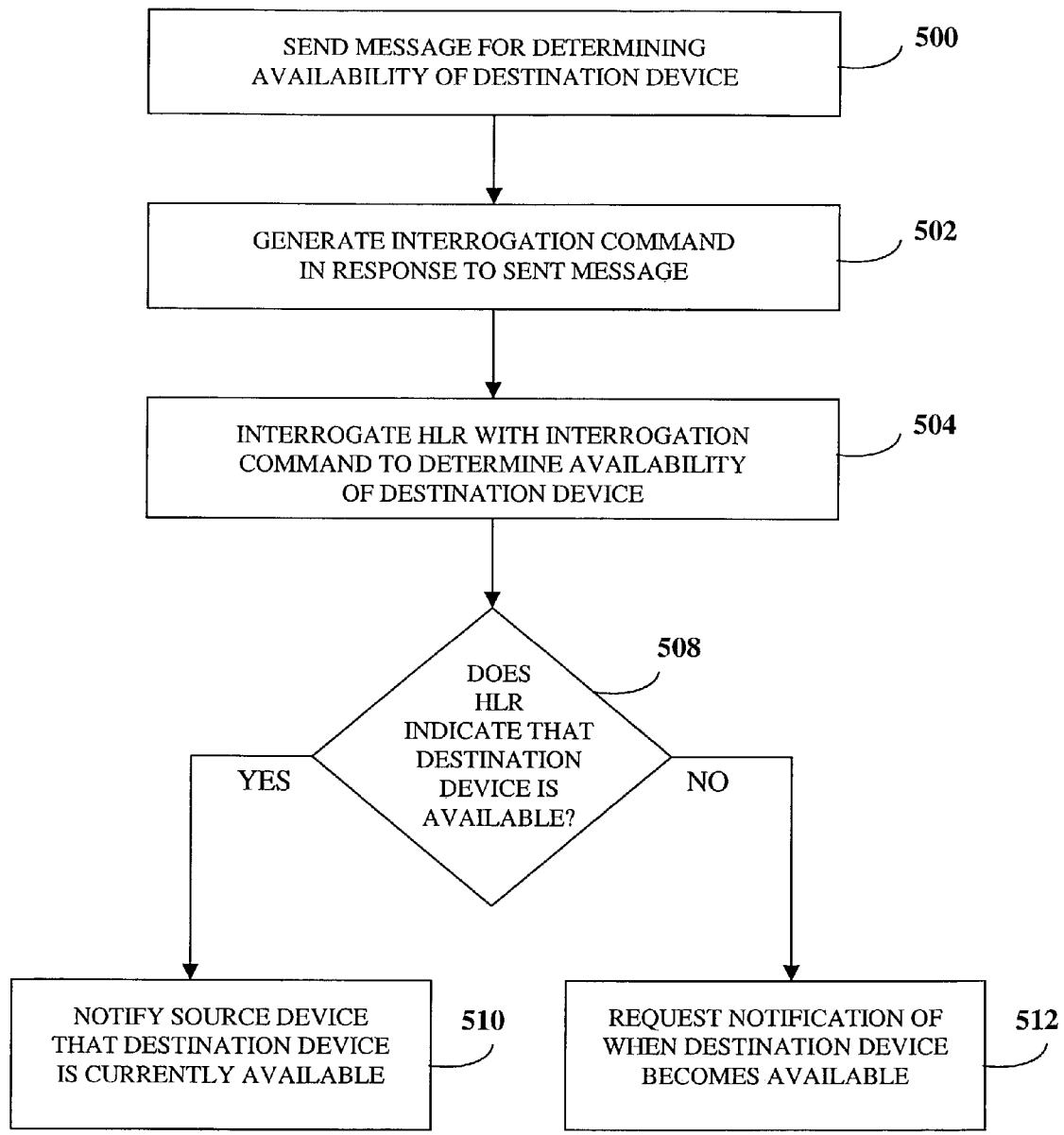
FIG. 5 illustrates a method for determining the availability of a device in a CDMA network.

FIG. 5 illustrates a method for determining the availability of a device in a communications network, such as a CDMA network. First, a message is sent from a source device for determining the availability of a destination device (500). Then, an interrogation command is generated in response to the sent message (502) and is used to interrogate the HLR in order to determine whether the destination device is available (504).

Figure 6:
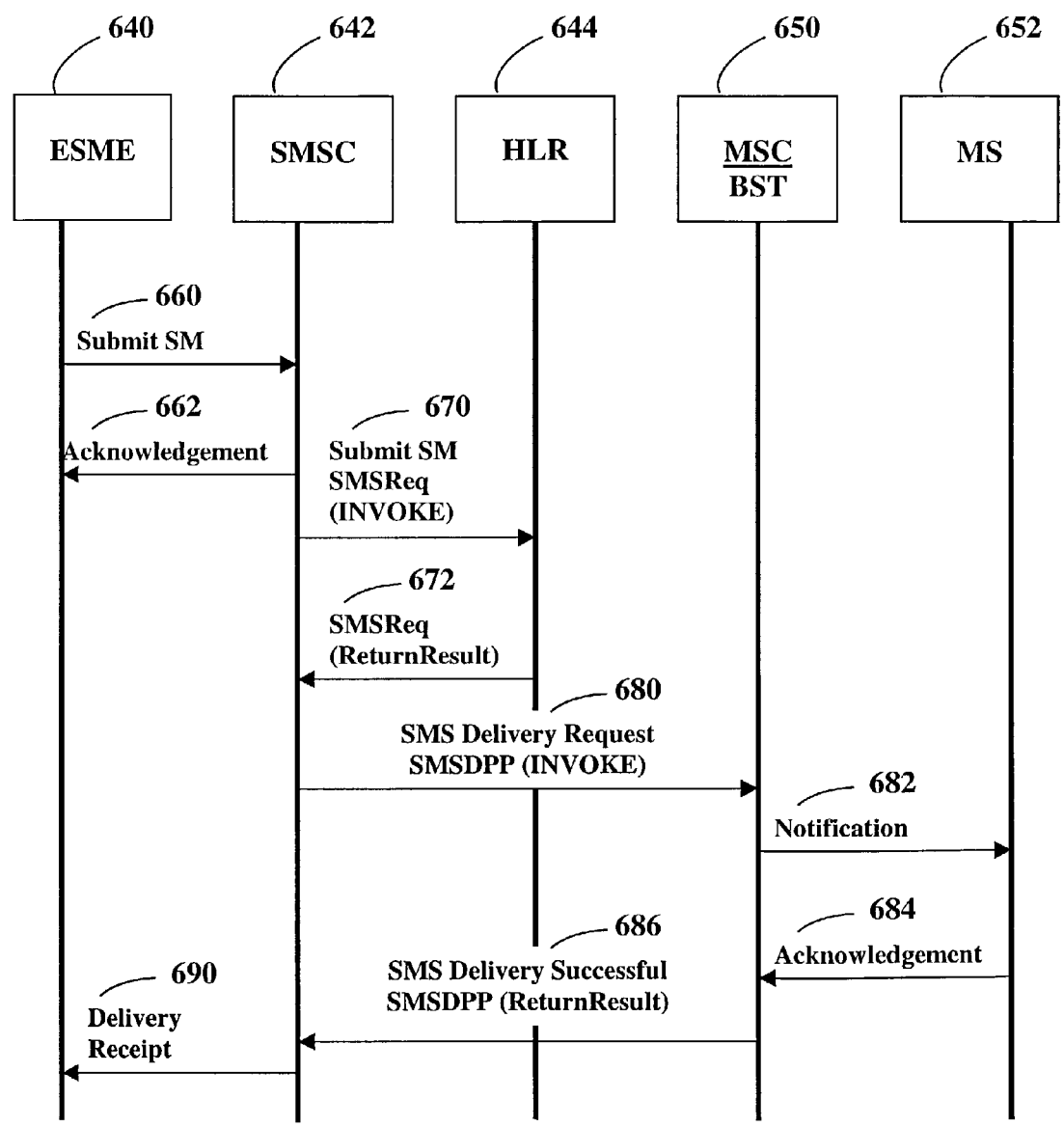
FIG. 6 illustrates a conventional scenario of interrogating an HLR and then delivering a message to a destination device.

FIG. 6 illustrates a prior art scenario of interrogating the HLR and then delivering a message to the destination device. As shown in FIG. 6, a short message is sent from the ESME 640 to the SMSC 642, as indicated by flow 660. Thereafter, the SMSC 642 sends an acknowledgement to the ESME 640, as indicated by flow 662, acknowledging receipt of the short message. After completing its internal processing, the SMSC 642 interrogates the HLR 644, as indicated by flow 670. In response to this interrogation, the HLR 644 sends the routing information for the mobile subscriber (MS) 652 to the SMSC 642, as indicated by flow 672. In accordance with the routing information, the SMSC 642 sends the short message to the MSC 650, as indicated by the flow 680, using the SMSDPP Invoke operation. Upon receipt, the MSC 650 transfers the short message to the MS 652, as indicated by flow 682. In response, the MS 652 returns an acknowledgement to the MSC 650, as indicated by flow 684. Thereafter, the MSC 650 returns to the SMSC 642 the outcome of the SMSDPP operation, as indicated by flow 686. Additionally, if requested by the ESME 640, the SMSC 642 returns a delivery receipt indicating successful delivery of the short message, as indicated by flow 690.

Figure 7:
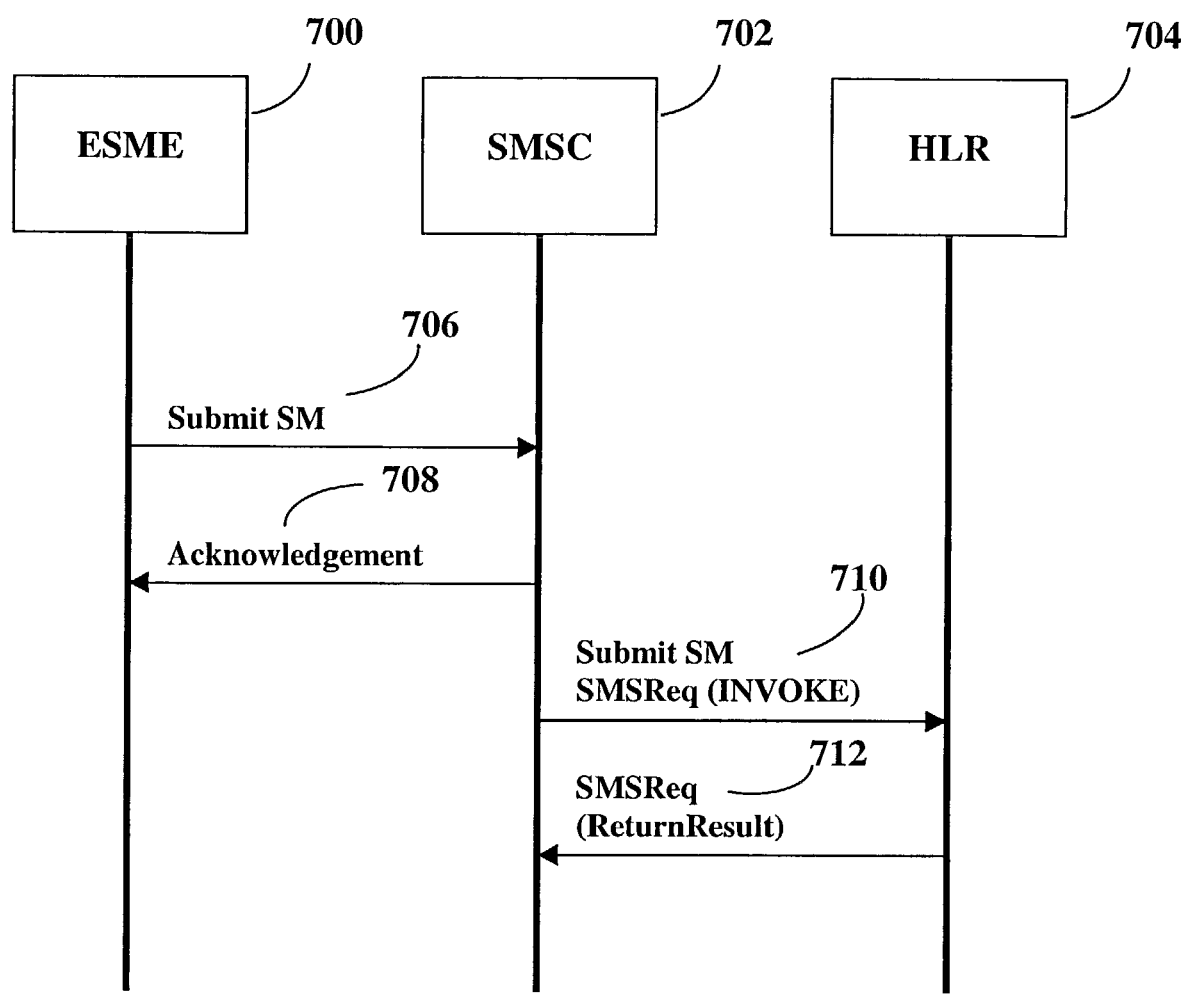
FIG. 7 illustrates an exemplary interrogation command exchange for the method of FIG. 5.

Conversely, FIG. 7 illustrates an interrogation command exchange in which a request to be notified when the destination device becomes available is carried out without a message being sent. In FIG. 7, an external short message entity (ESME) 700 submits a short message to the short message service center (SMSC) 702, as indicated by flow 706 (Submit SM), requesting that an alert be provided when the targeted handset becomes available. Thereafter, the SMSC 702 sends an acknowledgement, as indicated by flow 708, to the ESME 700, indicating reception of the request. After completing its internal processing, the SMSC 702 interrogates the home location register database (HLR) 704, as indicated by flow 710, with the notification indicator mark on requesting that an alert be provided by the corresponding mobile switching center (MSC) once the handset becomes available. Thereafter, the HLR 704 sends the routing information for the mobile subscriber to the SMSC 702, as indicated by flow 712, which in this case returns a result that the subscriber is currently not available.

Thus, as can be seen in FIG. 7, using only a few messages (compared with the prior art approach of FIG. 6) provided by the underlying protocol, the ESME 700 can request to be notified when a handset (user) becomes available without sending any message to the user. A resulting notification scenario for when a handset becomes available is illustrated in FIG. 8.

Figure 8:
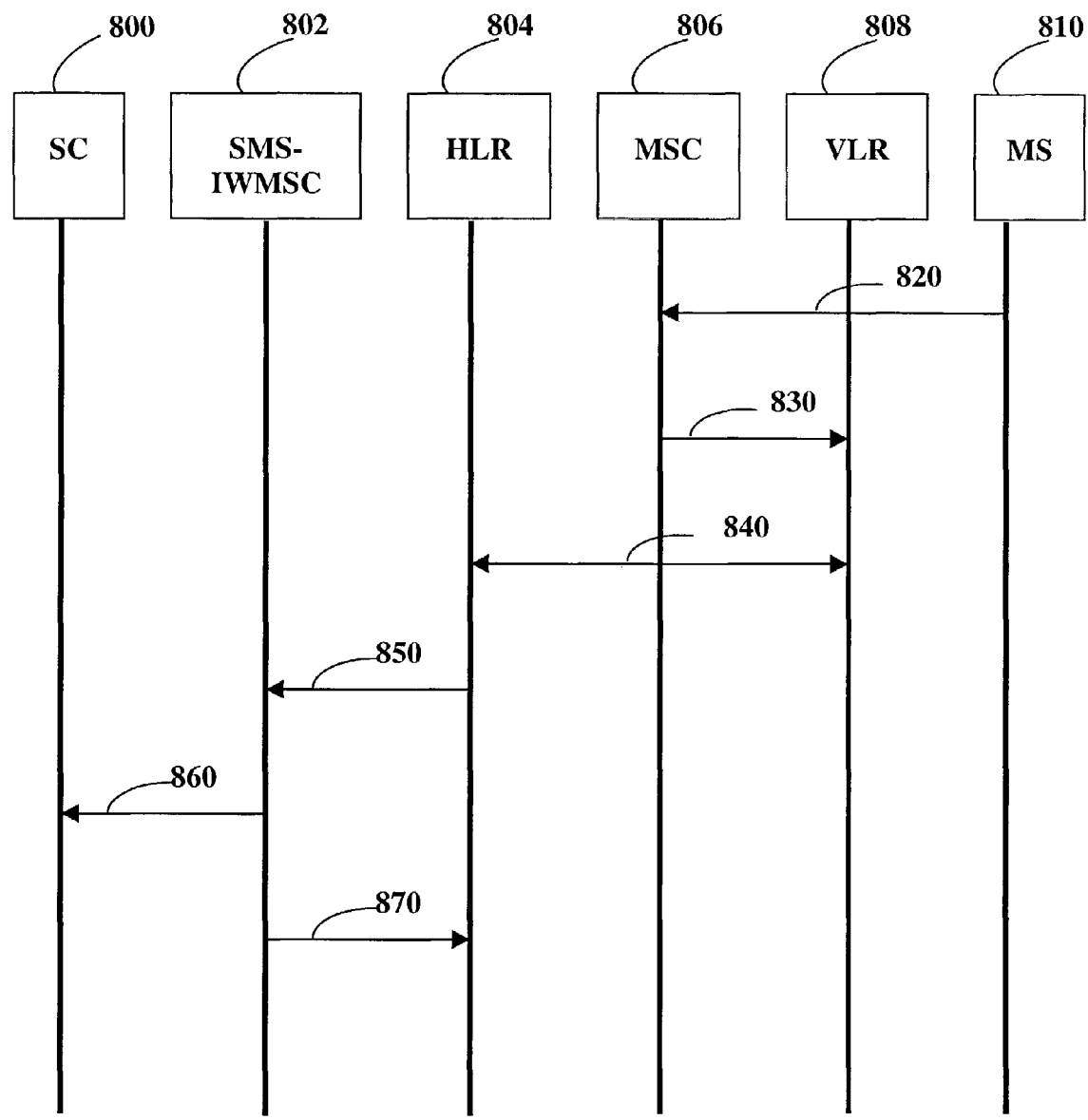
FIG. 8 illustrates a notification scenario for when a handset becomes available.

In FIG. 8, the MS 810 sends a service request, page response or location updating information to the MSC 806, as indicated by flow 820. In response thereto, MSC 806 uses the mobile application part (MAP), which allows for the exchange of mobility information between the switching system and the databases, to send the MAP message MAP_PROCESS_ACCESS_REQUEST/MAP_UPDATE_LOCATION_AREA to the visitors' location register database (VLR) 808, as indicated by flow 830. Thereafter, the VLR 808 sends the MAP message MAP_READY_FOR_SM to the HLR 804 and receives an acknowledgement therefrom, as indicated by flow 840. Next, the HLR 804 sends the MAP message MAP_ALERT_SERVICE_CENTER to the SMS interworking MSC (SMS_IWMSC) 802, which is an MSC capable of received a short message from a mobile network and submitting it to the appropriate SMSC, as indicated by flow 850. Thereafter, the SMS-IWMSC 802 alerts the service center (SC) 800 as to the availability of the MS 810, as indicated by flow 860. Then, the SMS-IWMSC 802 can send an acknowledgement in the form of the MAP message MAP_ALERT_SERVICE_CENTER_ACK to the HLR 804, as indicated by flow 870.

Thus, because the message that triggers interrogation of the HLR is never delivered to the destination device, the availability of the destination device can be determined without annoying or otherwise interfering with a user of the destination device.

In FIG. 5, if upon interrogation the HLR indicates that the destination device is available (YES at 508), the source device is notified that the destination device is currently available (510).

However, if the HLR indicates that the destination device is not currently available (NO at 508), the HLR is requested to provide a notification when the destination device becomes available (512). Thus, external applications are able to obtain information otherwise not available to them in order to receive an alert indicating the availability of a destination device.

An SMSC or MSC in the communications network can request an alert when the destination device becomes available. An exemplary technique is to have the SMSC or MSC instruct the HLR 340 via command 370 to provide an alert when the HLR 340 receives a registration message from the handset 330. For example, the submit SM Smsreq (Invoke) command 710, with the notification indicator being on, can be used as such as a command. Thereafter, when the destination device registers as available in the HLR, the HLR alerts the SMSC or MSC that requested an alert. Additionally, the SMSC can continue to retry sending data to the device for any situations that waiting for an alert will not adequately address, for example, when an SMS does not reach the device because of a temporary coverage problem.

Figure 9:
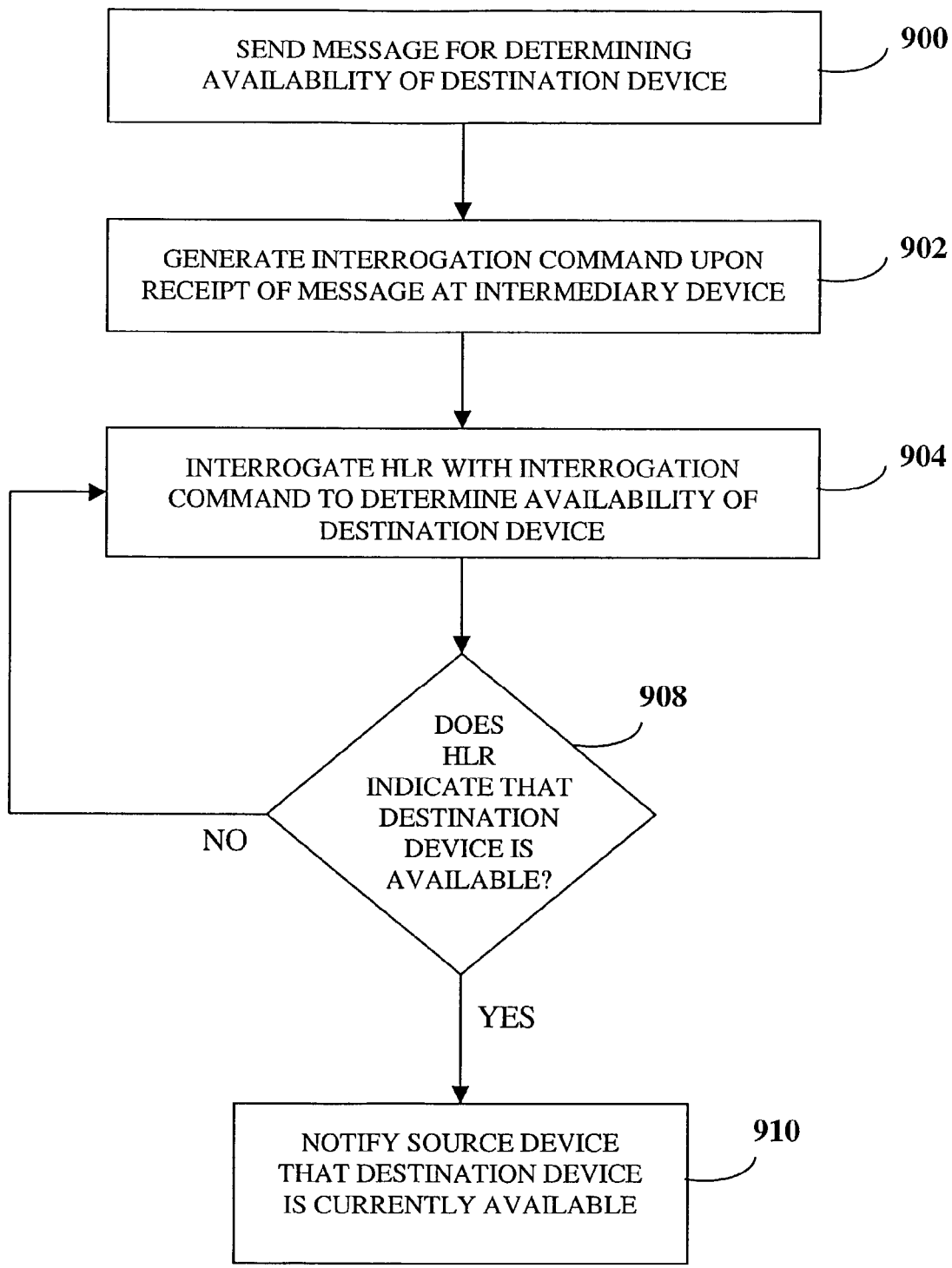
FIG. 9 illustrates another method for determining the availability of a device in a CDMA network.

FIG. 9 illustrates an alternative method for determining the availability of a device in a communications network, such as a CDMA network. First, a message is sent from a source device for determining the availability of a destination device (900). Then, an interrogation command is generated in response to the sent message (902) and is used to interrogate an HLR, for example as discussed above, in order to determine whether the destination device is available (904). Alternatively, the sent message can be converted by the SMSC 320 into the interrogation command.

If the HLR indicates that the destination device is available (YES at 908), the source device is notified that the destination device is currently available (910).

However, if the HLR indicates that the destination device is not currently available (NO at 908), the HLR is reinterrogated, in order to determine whether the destination device is available (904). Additionally, the reinterrogation of the HLR can be delayed, for example, by a predetermined period for time. This reinterrogation (which might also be called "polling") can be repeated a predetermined number of times, for a predetermined period of time, until the device becomes available or until some other even occurs. For example, this polling can be terminated in response to receipt from the application 310 of a second command.

Thus, a method and system for providing SMS0-type functionality in a CDMA environment is disclosed.

It will be appreciated by persons skilled in the art that the present invention is not limited to what has been particularly shown and described hereinabove. Rather the scope of the present invention is defined by the append claims and changes may be made in the form, construction, procedure and arrangement of its various elements and steps without departing from its spirit or scope.

I claim:

1. A method for detecting availability of a target device in a mobile communications network, comprising
    interrogating a database in response to an SMS class 0 message sent from a source device to determine whether the target device is available, said database including data that represents the availability of the target device,
    wherein if the target device is determined to be available, informing the source device that the target device is available, and
    wherein if the target device is determined to be unavailable, requesting that the database send an alert when the target device becomes available.

2. A method for detecting availability of a target device in a mobile communications network, comprising:
    interrogating a database in response to a first message sent from a source device to determine whether the target device is available, said database including data that represents the availability of the target device;
    if the target device is available, notifying the source device that the target device is available;
    if the target device is unavailable, notifying the source device when the target device becomes available; and
    sending a second message from the source device to the target device when the source device is notified that the target is available, wherein the second message is an SMS message.

3. A method for detecting availability of a target device in a mobile communications network, comprising
    interrogating a database in response to a first message sent from a source device to determine whether the target device is available, said database including data that represents the availability of the target device;
    wherein the interrogating is initiated by an SMSC,
    wherein if the target device is determined to be available, informing the source device that the target device is available, and
    wherein if the target device is determined to be unavailable, requesting that the database send an alert when the target device becomes available.

4. A system for detecting availability of a target device in a communications network, comprising:
    a database storing data describing the availability of the target device; and
    an intermediary device, that, in response to receipt of a message sent by a source device via a communications network, generates a command for interrogating the database to determine the availability of the target device,
    wherein if the target device is determined to be available, the intermediary device informs the source device that the target device is available, and
    wherein if the target device is determined to be unavailable, the intermediary device requests that the database send an alert when the target device becomes available.

5. The system of claim 4, wherein the alert is sent to the intermediary device, and the intermediary device informs the source device that the target device is available.

6. The system of claim 4, wherein the alert is sent to the source device.

7. The system of claim 4,
    wherein the message is a first message, and
    wherein when the source device is informed that the target device is available, the source device sends a second message to the target device, wherein the second message is an SMS message.

8. The system of claim 4, wherein when the source device is informed that the target device is available, communication is established between the source device and the target device.

9. The system of claim 4, wherein the first message is an SMS class 0 message.

10. The system of claim 4, wherein the intermediary device is an SMSC.

11. A system for detecting availability of a target device in a communications network, comprising:
    an intermediary device that, in a response to receipt of a message sent by a source device via a communications network, (a) generates a command that interrogates a database that stores data describing the availability of the target device, and (b) receives a communication that indicates whether the target device is available,
    wherein if the communication indicates that the target device is available, the intermediary device informs the source device that the target device is available, and
    wherein if the communication indicates that the target device is not available, the intermediary device requests that the database send an alert when the target device becomes available.

* * * * *